United States Patent
Dakss et al.

[11] 3,914,880
[45] Oct. 28, 1975

[54] OPTICAL FIBER COUPLER AND CONNECTOR

[75] Inventors: Mark L. Dakss, Waltham; Andrew Bridger, Brighton; Harry G. Olsen, Woburn, all of Mass.

[73] Assignee: GTE Laboratories Incorporated, Waltham, Mass.

[22] Filed: Aug. 19, 1974

[21] Appl. No.: 498,803

[52] U.S. Cl. .............................. 350/96 C; 350/96 R
[51] Int. Cl.² ........................................... G02B 5/14
[58] Field of search...350/96 C, 96 R, 96 B, 96 WG, 350/96 T; 403/306; 24/201 TR, 230 LP, 230 SL, 230 AK; 339/254 R, 48, 49 B; 269/321 N, 254 CS

[56] References Cited
UNITED STATES PATENTS
| | | | |
|---|---|---|---|
| 3,265,881 | 8/1966 | Hovnanian et al. | 350/96 B |
| 3,768,146 | 10/1973 | Braun et al. | 350/96 C |
| 3,789,485 | 2/1974 | Gudmestad | 350/96 C |
| 3,800,388 | 4/1974 | Börner et al. | 350/96 C |
| 3,861,781 | 1/1975 | Hasegawa et al. | 350/96 C |

FOREIGN PATENTS OR APPLICATIONS
| | | | |
|---|---|---|---|
| 3,622 | 1/1893 | United Kingdom | 269/254 CS |
| 319,086 | 1/1919 | Germany | 403/306 |
| 499,285 | 9/1950 | Belgium | 339/254 R |

OTHER PUBLICATIONS
Someda, B.S.T.J., Vol. 52, No. 4, Apr., 1973, pp. 583-596.
Bisbee, B.S.T.J., Vol. 50, No. 10, Dec., 1971, pp. 3153-3158.

*Primary Examiner*—Alfred E. Smith
*Assistant Examiner*—Jon W. Henry
*Attorney, Agent, or Firm*—Irving M. Kriegsman; Bernard L. Sweeney

[57] ABSTRACT

An optical fiber connector and coupler are described. The optical fiber connector has at least two external surfaces which are accurately finished and mate with other such surfaces in the coupler body to enable completed optical fiber couplers to establish highly efficient optical coupling between associated pairs of optical fibers. In one form of the optical fiber coupler, grooves are used to support and align the associated pairs of connectors. In another optical fiber coupler configuration, a machined hole enables the associated pair of optical fiber connectors to be aligned accurately in an abutting relationship.

26 Claims, 6 Drawing Figures

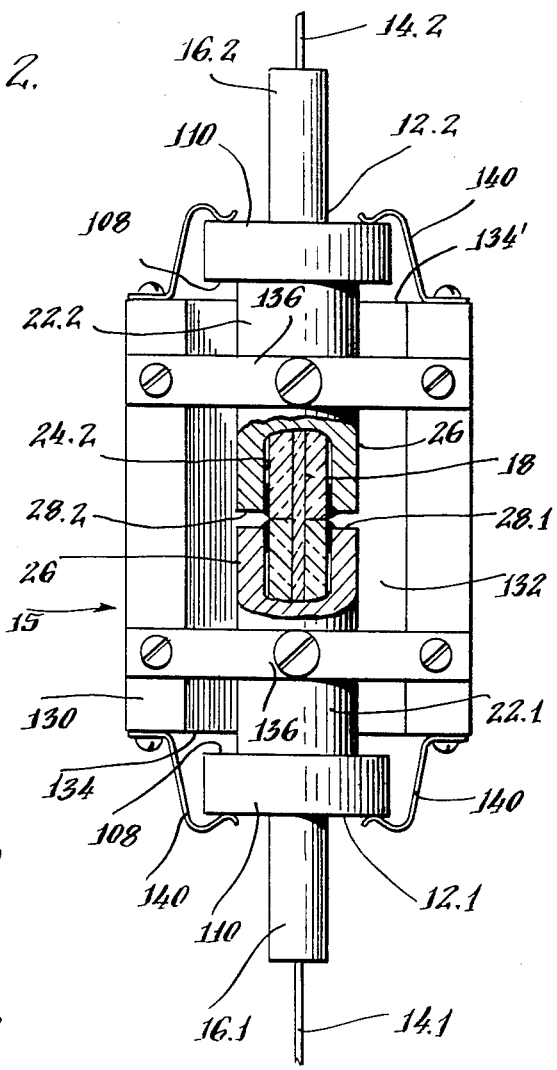
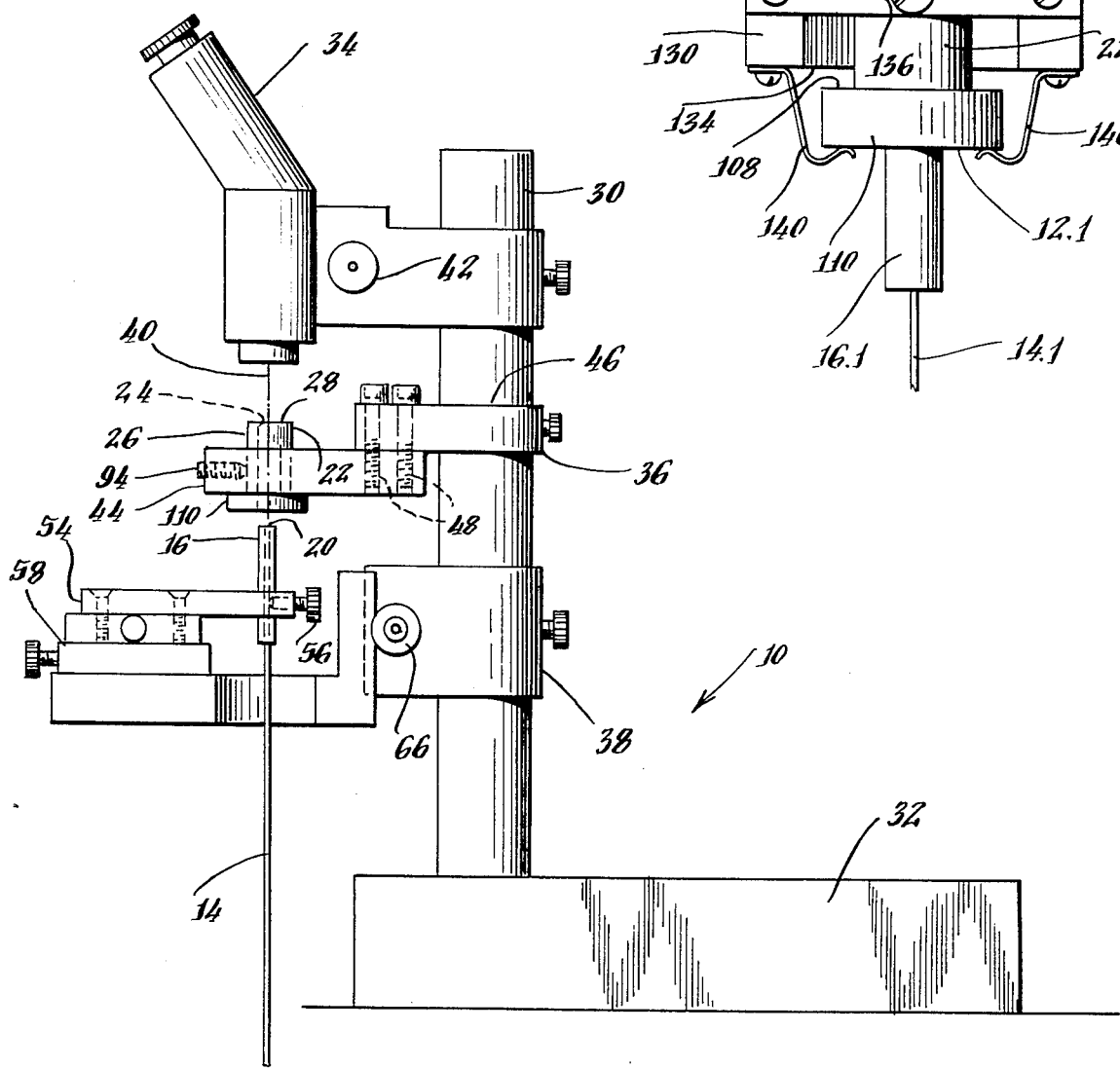

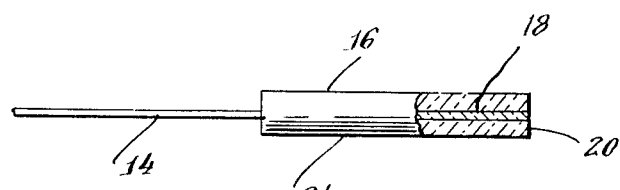
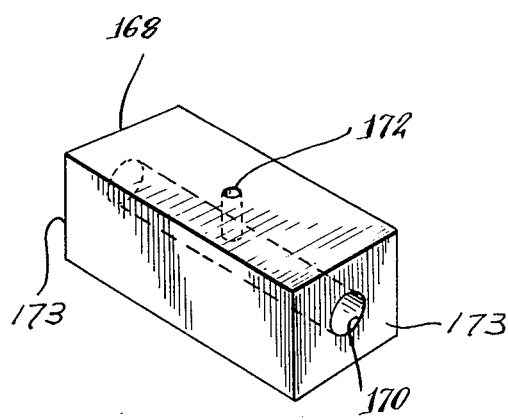
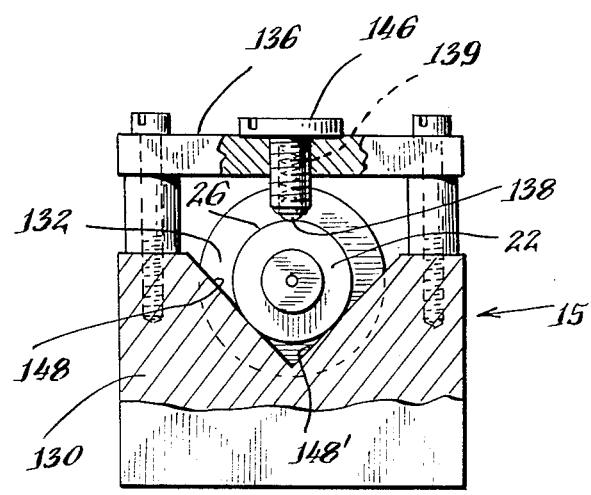
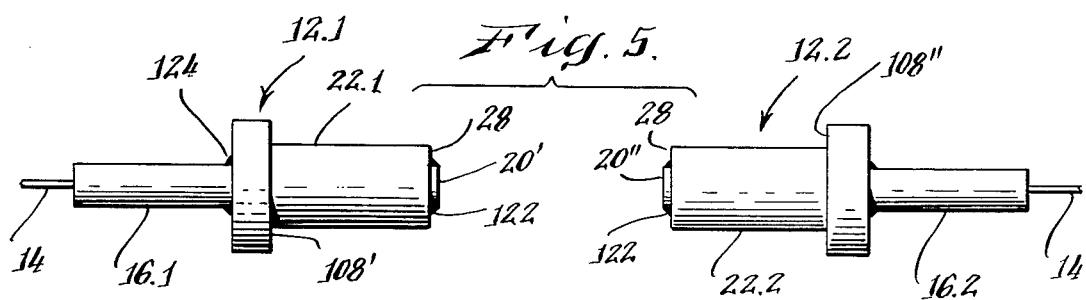

OPTICAL FIBER COUPLER AND CONNECTOR

BACKGROUND OF THE INVENTION

This invention relates generally to a connector and a coupler for optical fibers and is more particularly concerned with optical fiber connectors and couplers which are simple in construction and which are highly efficient in normal operating environment, whether in the field or in the laboratory.

A recent development in communication systems involves the use of optical fibers for very high bandwidth communication channels. The use of such optical fibers, which carry light energy distributed over an area, has led to a need for a coupler which can conveniently and efficiently couple a pair of optical fibers to each other. The difficulty in accomplishing this end is directly attributable to the cross sectional dimensions of the optical fibers. The dimensions for the light carrying portion of the optical fiber commonly are on the order of about 50 micrometers.

The coupling of optical fibers involves generally precise mechanical control of the alignment of the optical fibers to achieve low coupling losses. Furthermore, for such optical communications systems to be of general utility, the couplers associated therewith must be such as to be adaptable to use in the field. Therefore, the couplers must be rugged, yet simple in construction so as to provide physical protection for the actual optical fibers, yet allow for quick and convenient operation of the coupling function.

Various fiber to fiber coupling techniques have been reported in the literature such as, for example, the Krumpholz coupler described in the German publication AEU, ARCHIV FUR ELECTRONIK UND UBERTRAGUNGSTECHNIK, BAND 26 (1972), SEITEN (288–289). In this coupler, the mating ends of the two fibers to be connected are mounted eccentrically in metal plugs. The two plugs are rotatably inserted in holes in the coupler having parallel but slightly offset axes. When the plugs are rotated on their respective axes, the fiber ends trace out a pair of circles which intersect at two points so that, in principle, the fiber ends can be made to coincide precisely. However, although quite efficient, this technique is not readily adaptable to field use since the degree of alignment is only determinable by the passage of a signal through the junction. This requires either a second individual's participation in the coupling process or the use of a more complex coupling procedure and also leaves a likelihood of eventual misalignment when exposed to environmental forces and a likelihood of damage to the components after repeated use.

Other optical fiber coupling techniques have been disclosed also which are presently restricted to use in the laboratory environment. Included here are couplers for "liquid core" fibers and fibers emplaced in channels accurately formed in plastic plates. None of these techniques is susceptible to operational use in the field as part of an optical communications system, since each requires precise manipulation of the bare, very fragile optical fibers.

SUMMARY OF THE INVENTION

It is, therefore, an object of the present invention to provide a novel optical fiber coupler which is convenient to employ; and which may be utilized to align in the field optical fibers in a precise manner without complex testing and instrumentation so that a high coupling efficiency may be attained repeatedly.

It is another object of the invention to provide such a coupler which can be readily adapted to a variety of optical fiber connector configurations, including coupling directly to light sources and detectors.

It is a further object of the invention to provide such an optical fiber coupler of simple and rugged construction for retaining fiber connectors in optical coupling relationship.

It is a still further object of the present invention to provide a novel optical fiber connector which may be advantageously used inter alia in the optical fiber coupler of the present invention.

Accordingly, the invention in its broadest aspect is an optical fiber coupler and an optical fiber connector. The optical fiber coupler includes a pair of like cylindrical optical fiber connectors each having an end of an optical fiber precisely located at one end of the connector approximately at the axis thereof. A rigid coupler block has a channel therethrough which is dimensionally constant along its length to receive and accurately locate the pair of optical fiber connectors with their one ends in a juxtaposed, opposed relationship, so that the optical fibers are aligned end to end in the coupler. Means are provided for firmly seating and retaining the optical fiber connectors in the channel to enable efficient optical coupling between the optical fibers.

The connector for an optical fiber has an inner rigid cylindrical sleeve having a generally axial bore therethrough, the bore being sized to enable the optical fiber to be inserted therein for fixedly adhering the optical fiber to the inner sleeve at a first end thereof. The optical fiber is located accurately relative to an external surface of the main body so that efficient optical coupling of the optical fiber to another similarly mounted optical fiber may be accomplished.

These and other objects, advantages and features of the invention will be apparent from the following detailed description of the preferred embodiments taken together with the accompanying drawing.

BRIEF DESCRIPTION OF DRAWING

In the drawing,

FIG. 1 is a side view of an instrument used in forming an optical fiber connector according to the present invention;

FIG. 2 is an enlarged top view which is partially broken away of a pair of optical fiber connectors in accordance with the invention as used in an optical fiber coupler also in accordance with the invention;

FIG. 3 is a greatly enlarged, side view, partially broken away, of a capillary sleeve employed in the optical fiber connector shown in FIG. 2;

FIG. 4 is an end view of an optical fiber connector assembled in an optical fiber coupler;

FIG. 5 is an exploded view of a pair of opposed optical fiber connectors in accordance with the invention; and FIG. 6 is a perspective view of another embodiment for an optical fiber coupler block.

DETAILED DESCRIPTION OF THE PREFERRED EMBODIMENTS

In referring to the several figures of the drawing, like reference numerals are used to refer to identical parts of the apparatus described.

Referring initially to FIGS. 2 through 5, there is shown an optical fiber connector 12 and an optical fiber coupler 15 according to the present invention. The optical fiber connector 12 includes an inner sleeve 16 having an axial through bore 18 to receive an optical fiber 14. The inner sleeve 16 is formed generally of a rigid material such as a glass. The bore 18 should be somewhat larger in diameter than the optical fiber 14 to facilitate the assembly thereof but should keep the optical fiber positioned relatively close to the axis of the inner sleeve 16, such that the axis of the optical fiber 14 remains essentially parallel to the axis of the inner sleeve 16.

The inner sleeve 16 is affixed to the optical fiber 14 with a suitable adhesive so that a firm interconnection is obtained between the optical fiber 14 and the inner sleeve 16 at a first end 20 of the inner sleeve 16. An example of a suitable, commercially available adhesive is Eastman 910, a product of Eastman Kodak Co., Rochester, N.Y. The inner sleeve 16.1, see FIG. 5, is selected with a capillary sized bore which is generally parallel, preferably to within about 1° with the outer cylindrical surface 21 to assure that the bores of a pair of opposed optical fiber connectors, such as 12.1 and 12.2 in FIG. 5, and; therefore, the contained optical fibers are sufficiently parallel to permit efficient optical coupling.

The parameters which control the coupling efficiency are the relative positions of the axes of the optical fibers, the parallelism of these axes and losses through reflection at the coupling interfaces. The optical fiber 14 tends to locate itself along a wall of the bore 18 thereby aligning itself closely parallel to the axis of the bore 18 so long as the bore is not greatly oversized relative to the optical fiber.

The inner sleeve 16 is mounted in the connector 12 which is formed of a main body 22 having a through bore 24. The bore 24 is sized to receive freely the inner sleeve 16. The bore 24 is sufficiently oversized relative to the inner sleeve 16 so that a predetermined dimensional relationship may be established between the optical fiber 14 and an external surface of main body 22. In this embodiment of the invention, the main body 22 has a generally right circular cylindrical shape over a major portion of the length. The external surface 26 over that portion is controlled to a uniform diameter and the optical fiber 14 is centered with respect thereto. However, as will be readily seen, other external surfaces or shapes may also be used to index the fiber location, for example, a planar surface on the connector main body 22.

The main body 22 may be formed with a rear seating and holding shoulder 110 having a bearing surface 108 thereon adjacent to and generally extending normally from the external surface 26. The shoulder 110 serves to provide a convenient handling surface and protection for the more precise surface 26 as well as a locating function during assembly.

The inner sleeve 16 is affixed to the main body 22 with a suitable adhesive such as an epoxy as shown in FIG. 5 by reference numeral 122. In the present embodiment, the inner sleeve protrudes slightly from the end surface 28 of the main body member 22 to allow for mating of the optical fiber 14 to a similarly mounted fiber in an abutting relationship. In addition, a similar bond 124 is made at the opposite end of the main body 22. In this manner, the optical fiber 14 is controlled closely relative to the external surface 26.

Referring now to FIGS. 2 and 4, an optical fiber coupler 15 includes a rigid block 130 across which is provided a channel 132 extending between the opposite ends 134 and 134'. The channel 132 is preferably V-shaped to accommodate the circularly cylindrical main body 22 of a pair of opposed juxtaposed optical fiber connectors 12, although other channel shapes are included within the purview of this feature of the invention. The groove 132 is selected in length so that the first ends 20 of the inner sleeves 16 which locate the optical fibers 14 may be brought into close proximity or an abutting relationship.

A retainer strap 136 is removably affixed to the block 130 to retain the connector 12 in the coupler 15. The strap is located generally transverse to groove 132 and above the optical fiber connector 12 to position the opposed optical fibers 14.1 and 14.2 in an operative coupling relationship.

As shown in FIG. 4, a means 146 is provided for spring biasing the optical fiber connector 12 against the operative surfaces 148 and 148' of the V-grooved channel 132. The means 146 may be, for example, a screw such as is shown in FIG. 4 which provides pure radial loading against the optical fiber connector 12 thereby forcing the connector firmly and equally against both V-groove surfaces. Such a screw includes a captive spherical ball 138 in the tip which is longitudinally biased by an internal coil spring 139.

Other such arrangements for seating and holding the connectors 12 in the connector groove 132 such as a flexible strap bearing directly against the connector 12 are also included within the purview of the invention.

Although the means 146 is usually sufficient to assure retention of the optical fiber connectors 12 in the channel 132, end located, retaining devices such as spring clips 140 (see FIG. 2) may be employed to apply end pressure against the optical fiber connectors 12. Alternatively, bayonet engaging devices such as used with "BNC" coaxial connectors may also be used.

In the coupler 15 for optical fibers, precise alignment may be achieved between mating fibers even in a field environment if the fibers are located precisely relative to some external surface, a planar surface with a precise stop, for example. Therefore, other connector devices besides that described above may be used so long as the locating restraint between the fiber and an external surface is maintained.

Although the preferred arrangement for the mating of the connector 12 and the channel 132 is a right circular cylinder against the side walls of a V-groove, other arrangements which offer the same result, such as a U-channel with a right circular cylindrical connector bearing against the lips of the channel, is also acceptable.

A further alternate arrangement for an optical fiber coupler block is shown in FIG. 6. The channel 132 in FIG. 2 is replaced by a tight-fitting through hole channel 170 sized to receive a pair of optical fiber connectors 12 from the opposite ends 173. The channel 170 has a centrally located hole 172 for allowing air to escape as the connectors 12 are inserted into the channel 170.

A suitable fluid having an index of refraction essentially the same as the optical fiber material may be inserted between the ends of the fibers to reduce losses due to reflections at the ends of the optical fibers. The use of such a fluid, usually an oil, also allows for the use of fibers having other than polished ends, such as cleaved ends without deleteriously affecting the coupling efficiency.

Obviously, multiple channel optical fiber couplers may be formed within the purview of the invention simply by forming a desired plurality of channels in the block in a generally parallel arrangement and by providing either individual or composite seating means.

Optical fiber connectors and couplers contructed according to the present invention have regularly achieved coupling efficiencies in excess of 85% with individual units exceeding 95%.

Referring now to FIG. 1, an instrument 10 is shown which is useful for forming the fiber optical connectors of the present invention. This instrument and the method for its use are the subject of a separate patent application entitled "Method and Apparatus for Forming Optical Fiber Connectors" by Dakss et al., which is filed concurrently with the instant application and which has a common assignee.

The instrument 10 includes a verticle support column 30 mounted on a base 32. The column 30 supports an alignment microscope 34, an optical fiber connector main body fixture 36, and an inner sleeve fixture 38. The alignment microscope 34 has a viewing axis 40 which is parallel to the column 30. The alignment microscope 34, the optical fiber coupler main body fixture 36, and the inner sleeve fixture 38 are relatively rotatable about and slidable vertically along the column 30 for rough positioning of the various parts which may be fixedly secured to the column.

The main body fixture 36 and the inner sleeve fixture 38 have incorporated therein means for more accurate horizontal adjustment in position. The main body fixture is prealigned so that the viewing axis 40 of the microscope 34 is accurately aligned with the axis of the optical fiber connector main body 22 by an adjusting means 48. A dummy plug having the same external diameter as the surface 26 on the main body 22 and having an axis indexing means thereon is mounted in the fixture 36. The axis indexing means is then aligned with viewing axis 40 by lateral adjustment of the plates 44 and 46. Thereafter, any main body 22 fastened to the fixture with means 94 is aligned on the viewing axis 40.

The inner sleeve fixture 38 has means 56 for supporting an inner sleeve with an optical fiber 14 mounted thereon in a vertical position in a plate 54. The plate 54 is fastened to a horizontal translator 58 which in turn is affixed to the column 30. A means 66 is also provided for vertical translation of the inner sleeve assembly 16. The means 66 raises the assembly 16 through the bore 24 in the main body 22 to a position where the end surface 20 is focused in the microscope 34. This positions the end surface 20 relative to the surface 28 as accurately as desired. The relative accuracy is determined by selection of the depth of focus of the microscope 34. The translator 58 is operable to position the end of the optical fiber 14 on the viewing axis 40. The inner sleeve 16 is affixed to the main body 22 as detailed above to complete the optical fiber connector 12.

While there have been shown and described what are considered to be preferred embodiments of the present invention, it will be obvious to those of ordinary skill in the art that various changes and modifications may be made therein without departing from the spirit of the invention as defined in the appended claims.

What is claimed is:

1. A connector for an optical fiber comprising
an inner rigid cylindrical sleeve generally having an axial bore therethrough, the optical fiber extending throughout essentially the entire bore, the bore having a diameter which is sufficiently close to that of the optical fiber to be essentially parallel to the axis of the bore, the optical fiber terminating essentially at a first end surface of the inner rigid cylindrical sleeve and extending beyond a second surface of the inner rigid cylindrical sleeve,
means for fixedly adhering the optical fiber within the axial bore in the inner rigid cylindrical sleeve,
a main body having a generally axial through bore and a first external longitudinal surface thereon which is parallel to the bore axis, the bore having a diameter at a first end surface of the main body which is larger than the inner rigid cylindrical sleeve, the inner rigid cylindrical sleeve being disposed in the through bore such that the first end surface of the inner rigid cylindrical sleeve is adjacent to the first end surface of the main body, such that the optical fiber is essentially parallel to the first external longitudinal surface and in a predetermined relationship thereto, and such that the optical fiber extends through the bore in the main body and beyond a second end surface thereof, whereby the optical fiber is accurately located relative to the external longitudinal surface of the main body so that efficient optical coupling of the optical fiber to another similarly mounted optical fiber may be accomplished, and
means for fixedly adhering the inner sleeve in the axial bore in the main body.

2. A connector for an optical fiber according to claim 1, wherein the first external longitudinal surface having the optical fiber accurately located with respect thereto is a circularly cylindrical external longitudinal surface.

3. A connector for an optical fiber according to claim 2, wherein the optical fiber terminates at the first end surface of the inner sleeve and the optical fiber and the inner sleeve are polished on the first end surface.

4. A connector for an optical fiber according to claim 3, wherein the main body further includes a circularly cylindrical shoulder of greater radial dimension than the first cylindrical external longitudinal surface disposed adjacent to the second end surface of the main body to provide a longitudinal seating surface for the optical fiber connector.

5. A connector for an optical fiber according to claim 3, wherein the inner sleeve and optical fiber protrude from the first end surface of the main body for permitting abutting contact with a correspondingly protruding sleeve and optical fiber of another similar optical fiber connector.

6. A connector for an optical fiber according to claim 5, wherein the inner sleeve is fixedly adhered to the main body with an adhesive.

7. A connector for an optical fiber according to claim 6, wherein the inner sleeve is attached to the main body with an epoxy adhesive.

8. An optical fiber coupler comprising
a pair of cylindrical optical fiber connectors each having a first external longitudinal surface thereon and an optical fiber end located at a first end of the connector approximately at the axis thereof and in a predetermined relationship to the first external longitudinal surface, the optical fiber extending beyond a second end of the optical fiber connector, a coupler block having an open channel across a planar surface of the block which is dimensionally constant along its length to receive and locate the pair of cylindrical optical fiber connectors with their first ends in a juxtaposed, opposed relationship, so that the optical fibers are aligned end to end in the coupler, and means for firmly seating and retaining the fiber optical connectors in the channel to enable efficient optical coupling between the optical fibers.

9. An optical fiber coupler according to claim 8, wherein the first external longitudinal surface on each of the optical fiber connectors is a right circularly cylindrical surface and establishes line contact on each side of the channel in the coupler block.

10. An optical fiber coupler according to claim 9, wherein the means for firmly seating and retaining the optical fiber connectors in the channel includes and individual spring biased element exerting a force on each of the connectors which is perpendicular to the axis of the connectors.

11. An optical fiber coupler according to claim 10, wherein each spring biased element includes a rotatable spherical tip which bears against the first external longitudinal surface of the optical fiber connector.

12. An optical fiber coupler according to claim 11, wherein the spring biased elements are carried by a strap attached to the coupler block and disposed transversely across the channel.

13. An optical fiber coupler according to claim 8, wherein a plurality of channels lie across the planar surface in a parallel spaced relationship, each of said channels having associated therewith means for firmly seating and retaining a pair of juxtaposed, opposed optical fiber connectors therein.

14. An optical fiber coupler according to claim 13, wherein each of the channels is a V-groove.

15. An optical fiber coupler according to claim 14, wherein the first external longitudinal surface on each of the optical fiber connectors is a circularly cylindrical surfaces on the optical fiber connectors bear against the sides of the V-groove channel.

16. An optical fiber coupler according to claim 8, wherein the channel is a V-groove.

17. An optical fiber coupler according to claim 16, wherein the first external longitudinal surface on each of the optical fiber connectors is a circularly cylindrical surface and wherein the width of the V-groove channel at the planar surface of the coupler block is such that the circularly cylindrical surfaces on the optical fiber connectors bear against the sides of the V-groove channel.

18. An optical fiber coupler according to claim 17, wherein each optical fiber connector comprises An inner rigid cylindrical sleeve generally having an axial bore therethrough, the optical fiber extending throughout essentially the entire bore, the bore having a diameter which is sufficiently close to that of the optical fiber to cause the optical fiber to be essentially parallel to the axis of the bore, the optical fiber terminating essentially at a first end surface of the inner rigid cylindrical sleeve and extending beyond a second end surface of the inner rigid cylindrical sleeve, means for fixedly adhering the optical fiber within the axial bore in the inner rigid cylindrical sleeve, a main body having a generally axial through bore and a first external longitudinal surface thereon which is parallel to the bore axis, the bore having a diameter at a first end surface of the main body which is larger than the inner rigid cylindrical sleeve, the inner rigid cylindrical sleeve being disposed in the through bore such that the first end surface of the inner rigid cylindrical sleeve is adjacent to the first end surface of the main body, such that the optical fiber is essentially parallel to the first external longitudinal surface and in a predetermined relationship thereto, and such that the optical fiber extends through the bore in the main body and beyond a second end surface thereof, whereby the optical fiber is accurately located relative to the external longitudinal surface of the main body so that efficient optical coupling of the optical fiber to another similarly mounted optical fiber may be accomplished, and means for fixedly adhering the inner sleeve in the axial bore in the main body.

19. An optical fiber coupler according to claim 18, wherein each first external longitudinal surface having the optical fiber accurately located with respect thereto is a circularly cylindrical external surface.

20. An optical fiber coupler according to claim 19, wherein the optical fibers terminate at the first end surfaces of the inner sleeves and are polished on the first end surfaces.

21. An optical fiber coupler according to claim 20, wherein each main body further includes a circularly cylindrical shoulder of greater radial dimension that the first cylindrical external longitudinal surface disposed adjacent to the second end surface of the main body to provide a longitudinal seating surface for the optical fiber connector.

22. An optical fiber coupler according to claim 21, wherein each inner sleeve and optical fiber protrude from the first end surface of the main body for permitting abutting contact with a correspondingly protruding sleeve and optical fiber of the other similar optical fiber connector.

23. An optical fiber coupler according to claim 22, wherein each inner sleeve is fixedly adhered to the main body with an adhesive.

24. An optical fiber coupler according to claim 23, wherein each inner sleeve is attached to the main body with an epoxy adhesive.

25. An optical fiber coupler according to claim 8, wherein an index of refraction matching fluid is interposed between the ends of the optical fibers to eliminate reflection losses.

26. An optical fiber coupler according to claim 8, wherein the pair of optical fibers have their ends disposed in an abutting relationship.

* * * * *